(No Model.) 2 Sheets—Sheet 1.

C. SAMPLE.
BRAKE MECHANISM FOR VEHICLES.

No. 543,754. Patented July 30, 1895.

Witnesses.
Robert Everett.
Geo. W. Rea.

Inventor.
Charles Sample.
By James L. Norris.
Atty.

(No Model.) 2 Sheets—Sheet 2.

C. SAMPLE.
BRAKE MECHANISM FOR VEHICLES.

No. 543,754. Patented July 30, 1895.

Witnesses.
Robert Emmett,
Geo. W. Rea

Inventor.
Charles Sample.
By James L. Norris.
Atty.

UNITED STATES PATENT OFFICE.

CHARLES SAMPLE, OF VALLEY GROVE, WEST VIRGINIA.

BRAKE MECHANISM FOR VEHICLES.

SPECIFICATION forming part of Letters Patent No. 543,754, dated July 30, 1895.

Application filed March 12, 1895. Serial No. 541,494. (No model.)

*To all whom it may concern:*

Be it known that I, CHARLES SAMPLE, a citizen of the United States, residing at Valley Grove, in the county of Ohio and State of West Virginia, have invented new and useful Improvements in Mechanism for Operating the Brakes of Wagons, Carriages, and other Vehicles, of which the following is a specification.

My invention relates to the mechanism for operating the brakes of wagons, carriages, and other vehicles, and is specially designed to furnish improved and easily-controlled means for operating the brake-levers connected with wagons for handling hay, and to so arrange the brake-operating mechanism for such vehicles that the said improved mechanism can be conveniently operated from any portion of the loaded wagon or from the back of one of the draft-animals or from the ground, as may be required.

The invention is also designed to provide improved detachable lever connections for the brakes of oil-wagons and such like vehicles that are usually loaded from over the side and where a brake-lever projecting above the vehicle-wheels would obstruct the loading and unloading of the wagon.

My invention is also adapted to the operation of brakes on farm-wagons and other vehicles where it is desirable that the brakes may be controlled from a seat located on the forward portion of the vehicle-body or from the rear of the wagon or top of a load, as when the wagon body and seat are removed to permit loading of the vehicle with lumber or other material not requiring the use of a wagon-body.

Although I will herein illustrate my improved brake operating, locking, and releasing mechanism in connection with a brake of the description shown in Letters Patent No. 521,389, granted to me June 12, 1894, I would have it understood that I do not limit myself to an application of the improved operating mechanism to a brake of any special character and construction or to any particular manner of mounting and arranging the brake-bar and its immediate connections.

The invention consists in the features of construction and novel combinations of parts in a brake-operating mechanism adapted to the requirements of different classes of vehicles and readily adjustable to varying circumstances, as hereinafter more particularly set forth.

Figure 2:
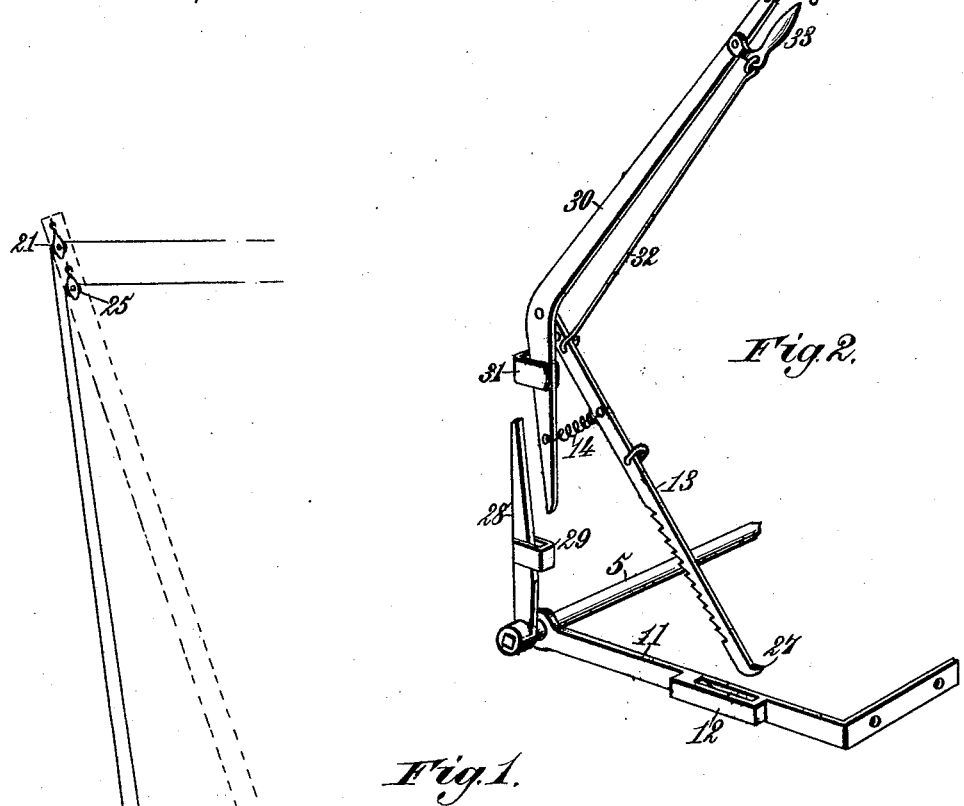
Figure 1:
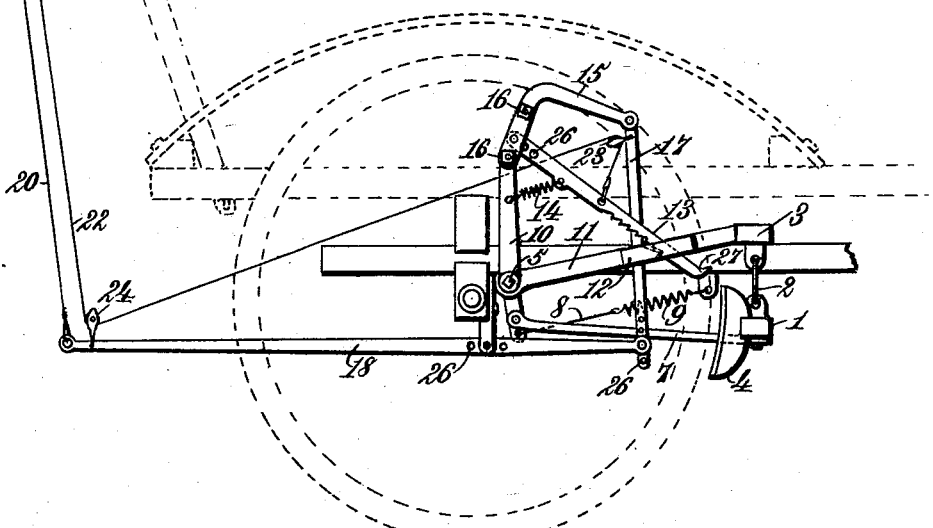
Figure 3:
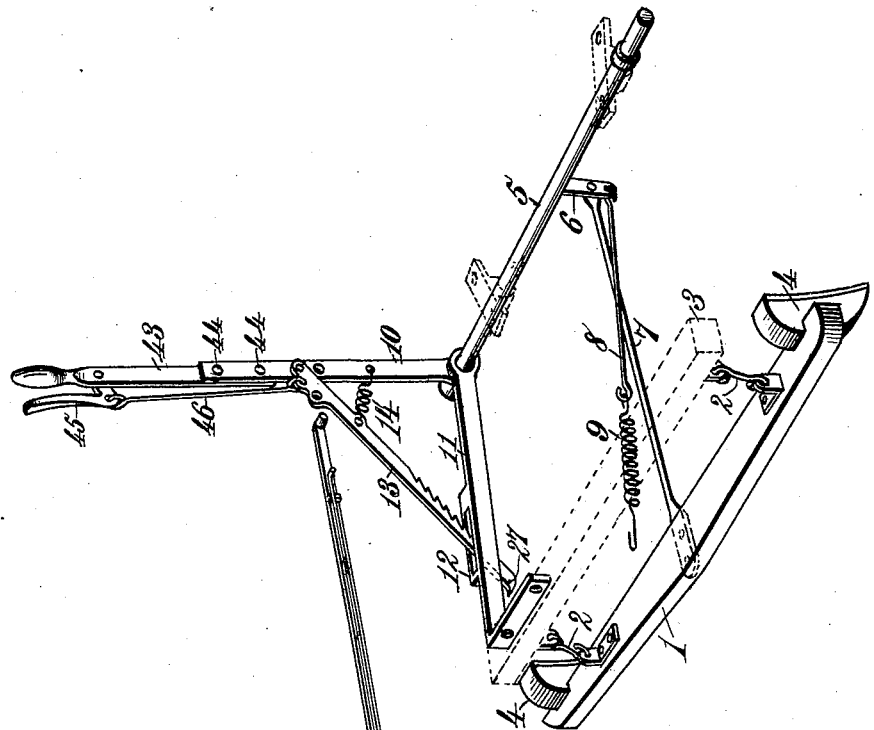

In the annexed drawings, Figure 1 is a view illustrating the application of my invention to the brakes for a hay-wagon. Fig. 2 is a view showing a novel construction of a detachable splice-joint for the lever extension of a brake-operating rock-shaft, together with automatic locking mechanism for the brake. Fig. 3 is a perspective of the brake mechanism and its operating-levers through which the brakes may be controlled from either or both ends of a vehicle.

As in my former patent above referred to, the brake-bar 1 may be suspended by means of links 2 from a cross-bar 3, supported on the hounds, and the ends of the brake-bar may carry brake-shoes 4, arranged to be brought into contact with the vehicle-wheels, as usual. In suitable bearings provided on the hounds is supported a rock-shaft 5, that is arranged transversely in rear of the brake-bar. At or about its center the rock-shaft 5 is provided with an arm 6, to which is attached the rear end of a connecting rod or bar 7, the forward end of which is secured to the central portion of the brake-bar. To the rock-shaft arm 6 is also connected one end of a link 8, the other end of which connects with a spirally-coiled spring 9, attached to a fixed point, as on the hounds, and so arranged that when the brakes are released the tension of said spring, acting through the rock-shaft arm 6 and connecting-rod 7 of the brake-bar, will move the brake-shoes quickly away from the vehicle-wheels. It is preferable to support the spring 9 on the hounds or at some fixed point independent of the reach and brake-bar, so that it will not be necessary to remove or disturb the said spring in making any required change in adjustment of the reach or coupling bar. On one end of the rock-shaft 5 is an upward-extended lever 10, that need not project above the vehicle-wheels. A bar 11 has its rear end loosely mounted on the rock-shaft 5, or may be otherwise supported, and the forward end of said bar 11 may be secured to the cross-bar 3, as shown. On this bar 11 is a loop-catch 12 or in lieu thereof a slot may be provided in the bar 11, as in my former patent, to engage with a ratchet-bar 13, the upper end of which is pivotally connected with the upper portion of the rock-shaft lever 10, preferably on its inner side. The teeth of the ratchet-bar 13 are on its rear edge and are formed in such manner as to have a locking engagement with the rear edge of the catch 12 under the tension of a spring 14, that connects the rock-shaft lever 10 and ratchet-bar 13 near their upper ends.

In their normal position the brake-shoes 4 are held away from the vehicle-wheels by the action of the spring 9, drawing forward the rock-shaft arm 6 and causing it to push on the connecting-rod 7, attached to the brake-bar. If the upward-projecting rock-shaft lever 10 is now thrown forward, the depending rock-shaft arm 6 will be carried backward, so as to draw on the connecting-rod 7 and brake-bar 1, and thus force the brake-shoes into contact with the wheels.

The forward swing of the rock-shaft lever 10 will carry the inclined ratchet-bar 13 easily downward in the loop or catch 12, the teeth of said ratchet-bar clicking past the rear edge of the catch without resistance, thus permitting the brakes to be applied quickly and with great ease. As soon as the rock-shaft lever 10 is brought to rest one of the teeth of the ratchet-bar 13 will come into locking engagement with the under side of the rear edge of the catch 12 under the tension of the spring 14, which is capable of exerting sufficient force to hold the brakes firmly in the position to which they may have been adjusted and to prevent any accidental displacement. The hereinbefore described mechanism, whereby these results are attained, is substantially the same as embraced in my former patent, No. 521,389, but it is a further object of my present invention to provide simple and effective mechanism for operating a vehicle-brake of this general character from a hay-wagon, whether loaded or unloaded, or from the back of one of the draft-animals, or from the ground, as occasion may require.

For the purpose of a hay-wagon or similar vehicle a forward-projecting arm 15, Fig. 1, may be formed on or secured to the upper portion of the rock-shaft lever 10, as shown. It is preferable to detachably secure this arm 15 to the lever 10 by means of two bolts 16 and accompanying nuts, so that the said arm will be firmly braced while in position, and may yet be quickly taken off for any purpose. To the forward end of the arm 15 is pivotally connected the upper end of a link, rod, or bar 17, the lower end of which connects pivotally with the forward end of a lever 18 that is fulcrumed intermediate its ends in a suitable bearing 19 beneath the running-gear of the vehicle, or at any convenient point of attachment. A suitable line, cord, rope, or chain 20 is secured to the rear end of the lever 18, and thence carried upward to and through a guide-pulley 21 on the hay-rack or "ladder," and thence forward to any point from which it may be desirable to operate the brakes. It is obvious that the rope or line 20 may be extended over the wagon or load to a point where it can be reached and operated from the back of a draft-animal; or it may be operated directly from the wagon or from the top of a load, as of hay. By pulling the rope or line 20 forward through the guide-pulley 21 the rear end of the lever 18 will be raised, thereby causing its forward end to pull down the link-bar 17 and lever-arm 15, so as to swing the rock-shaft lever 10 forward and apply the brakes through the action of the rock-shaft arm 6 and connecting-rod 7, drawing on the brake-bar, as before described. During the forward movement of the rock-shaft lever 10 the ratchet-bar 13 will slip down in the catch 12 without resistance, but as soon as the forward movement of the lever 10 ceases the ratchet-bar 13 will closely and firmly engage the catch 12 under the tension of the spring 14, and will thus automatically lock the brake-shoes in their rearward adjusted position, or in contact with the wheels, and until released the brake will remain in its rearward and locked position without liability of displacement. As a means for releasing and letting off the brake, a cord or line 22 may be attached to the ratchet-bar 13, then carried through a guide-pulley 23 on the upper portion of the link-bar 17, then rearward and through a guide-pulley 24 on the lever 18; thence upward through a guide-pulley 25 on the hay-rack or "ladder," and finally forward to the point from which the brake is to be operated. By drawing on this cord or line 22 the ratchet-bar 13 will be lifted from its engagement with the catch 12, so as to permit the brake-shoes to be thrown quickly off by the action of the spring 9, that connects with the rock-shaft arm, and thence through the rod 7 to the brake-bar, as hereinbefore described.

It will thus be seen that by means of the lever 18 and its connections the brakes can be quickly and easily applied or released by operation through the lines, chains, or ropes 20 and 22 from any point at the top of a load of hay or from the forward portion of the wagon or from a saddle on one of the draft-animals. Through the lever 18 and cord or line 22 the brake can also be operated from the ground, as when the teamster is walking.

As a means for facilitating a proper adjustable connection between the rock-shaft lever 10 and ratchet-bar 13, and between the link-bar 17 and lever 18, and between the latter and its fulcrum 19, any or all of these several parts may be provided with series of holes 26, so arranged that suitable connections may be easily made at desired points. It is preferable to provide the ratchet-bar 13 with a hooked lower end 27, that will act as a stop to prevent its disengagement from the catch 12 when the rock-shaft lever 10 is in its rearward position.

In oil regions, where it is customary to load oil-wagons at the sides or over the wheels, it is objectionable to have a permanent brake-lever projecting above a vehicle-wheel, and it is usual to provide only a stub or short projection on one end of the rock-shaft and to apply to this when needed a piece of pipe that will serve as a lever, and which may be put on and taken off from time to time. As an improvement on this crude and unsatisfactory means for operating the brakes of an oil-wagon, I have provided a simple and secure splice-joint that can be instantly applied to or detached from the stub or lever of a brake rock-shaft. The rock-shaft lever or stub 28, Fig. 2, is beveled on one edge, as shown, and has rigid therewith a loop-shaped socket 29 to receive the correspondingly beveled portion of a forwardly-inclined lever extension 30, on which is also a looped-shaped socket 31 to engage over and clasp the stub 28 of the rock-shaft. The lower end of the lever extension 30 will readily engage in the socket 29 of the stub 28, and the upper end of the latter will at the same time slip into or engage with the socket 31 on the lever extension, and by the wedging action of the correspondingly-beveled edges on the stub and the lever extension these parts will be firmly secured together in such manner that they can yet be quickly and readily disconnected when it is necessary to take off the lever extension 30 and prevent it from being an obstruction to the loading and unloading of the wagon from either side. The ratchet-bar 13, hereinbefore described, may be attached to and removable with the lever extension 30, and will be slipped down through the loop-catch 12 when the lever is put in place. With this form of device a releasing-rod 32 may have one end connected with the ratchet-bar 13 and its other end attached to a thumb-lever 33, mounted on the upper portion of the detachable lever extension. The ratchet-bar 13 may, however, be attached to the stub 28 and be left in place with the brake set, while only the lever extension 30 is removed. In this case the stub 28 will be made only a few inches longer, the splice being exactly the same. A detachable lever extension of this character is suitable not only for oil-wagons and the like, but is applicable wherever it is desirable to provide a brake mechanism with a convenient and quickly-detachable lever appliance.

If it is desired to operate the rock-shaft lever 10 and ratchet-bar 13 from the forward end of a wagon-body, a detachable lever 34, Fig. 3, may be pivoted to a stud 35, projecting from one side of the body, near the driver's seat. The inner side of this lever 34 is preferably provided with an offsetting and downward-projecting lug 36, adapted to engage in a guide 37, attached to the side of the wagon-body, and prevent lateral displacement of the lever. As, by means of the lug 36, the lever 34 can be securely arranged on the outside of the guide 37, it is obvious that the said lever may be put in place or detached more quickly and conveniently than if it were arranged inside the guide. To the lever 34 is attached the forward end of a connecting-rod 38, that may have its rear end detachably connected to the rock-shaft lever 10 in any convenient manner. On the lever 34 is also arranged a pivotal plate 39, connected with the ratchet-bar 13 by means of a rod 40, and also connected by a rod 41 to a releasing-lever 42 on the upper part of the said forward lever 34, through which, therefore, the brakes may be easily operated from a seat at the forward end of the vehicle.

When it is desired to operate the rock-shaft lever 10 directly from the rear end of a wagon, or from the top of a load of lumber or other material, a lever extension 43 of any suitable length may be firmly and detachably secured to the upper end of the lever 10 by means of two bolts 44, or otherwise. On this lever extension 43 is attached a thumb-lever 45 for operating a releasing-rod 46, connected with the ratchet-bar 13, as in my former patent.

What I claim as my invention is—

1. In brake-operating mechanism for vehicles, the combination of a rock-shaft through which the brakes are operated, a forwardly projecting lever secured to one end of said rock-shaft, a two-armed lever fulcrumed intermediate its ends and arranged below the upper portion of the rock-shaft lever, a link connecting the forward ends of said levers, a pull cord or rope attached to the rear end of the two-armed lever and extended upward, an automatic locking device for the brakes, and a pull cord or rope to release said locking device, substantially as described.

2. In brake-operating mechanism for vehicles, the combination of a rock shaft through which the brakes are operated, a lever secured to said rock shaft and provided with a forward projecting arm, a link depending from said arm, a lever fulcrumed below the running gear and having one end connected to said link, a pull cord or rope attached to the other end of the said lever and extended upward, an automatic locking device for the brakes, and a pull cord or rope to release said locking device, substantially as described.

In testimony whereof I have hereunto set my hand in presence of two subscribing witnesses.

CHARLES SAMPLE.

Witnesses:
JAMES L. NORRIS,
THOS. A. GREEN.